(12) United States Patent
Shishir et al.

(10) Patent No.: US 11,539,602 B2
(45) Date of Patent: Dec. 27, 2022

(54) CONTINUOUS MONITORING OF CONTAINERS USING MONITOR CONTAINERS CONFIGURED AS SIDECAR CONTAINERS

(71) Applicant: T-Mobile USA, Inc., Bellevue, WA (US)

(72) Inventors: Hemang Shishir, Bothell, WA (US); Ramprakash Gopinathan, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 39 days.

(21) Appl. No.: 17/001,367

(22) Filed: Aug. 24, 2020

(65) Prior Publication Data
US 2022/0060398 A1 Feb. 24, 2022

(51) Int. Cl.
*H04L 43/08* (2022.01)
*G06F 11/34* (2006.01)
*G06F 11/30* (2006.01)
*H04L 9/40* (2022.01)

(52) U.S. Cl.
CPC .......... *H04L 43/08* (2013.01); *G06F 11/3006* (2013.01); *G06F 11/3409* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,609,213 B1* | 8/2003 | Nguyen | G06F 11/2025 709/223 |
| 10,756,990 B1* | 8/2020 | Chakkassery Vidyadharan | G06N 20/00 |
| 2008/0081608 A1* | 4/2008 | Findikli | H04M 1/72412 455/425 |
| 2018/0270125 A1* | 9/2018 | Jain | H04L 67/1097 |

* cited by examiner

*Primary Examiner* — Anh Nguyen
(74) *Attorney, Agent, or Firm* — Lee & Hayes, P.C.

(57) ABSTRACT

Systems and methods discussed herein are directed to monitoring an application pod of a network using a sidecar container. The application pod comprises one or more containers and the sidecar container, where each of the one or more containers hosts a service for traffic of the network. The monitoring comprises periodically executing checks of a plurality of checks on the containers. The sidecar container, based at least in part on the checks, determines that a container is non-compliant. Based at least in part on the container being non-compliant, the container is removed from service. The container may be fixed and placed back in service or may be replaced with a new container that provides the service.

18 Claims, 5 Drawing Sheets

CONTINUOUS MONITORING OF CONTAINERS USING MONITOR CONTAINERS CONFIGURED AS SIDECAR CONTAINERS

BACKGROUND

Many entities and organizations, including operators of wireless communication networks, deploy large numbers of applications (apps) in containers to provide services to users. Indeed, the deployment of apps has grown exponentially to tens, even hundreds, of thousands of containers. Such containers may be executed geographically all over the world. As is known, for general cloud architecture, containers are generally executed in application pods and may also be referred to application containers or software service containers.

Insight as to the health and or compliance of containers for serving traffic is needed. Such traffic may be external or may be requests from other containers. Unfortunately, there is no easy way to see whether a container is healthy, compliant, meeting security requirements, has proper functionality, etc. Currently, when a container is instantiated, the container is checked, generally manually, for health and compliance. After that, the containers operate until a problem arises. When a problem arises, then the problem is addressed. Thus, the current process is generally reactive.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
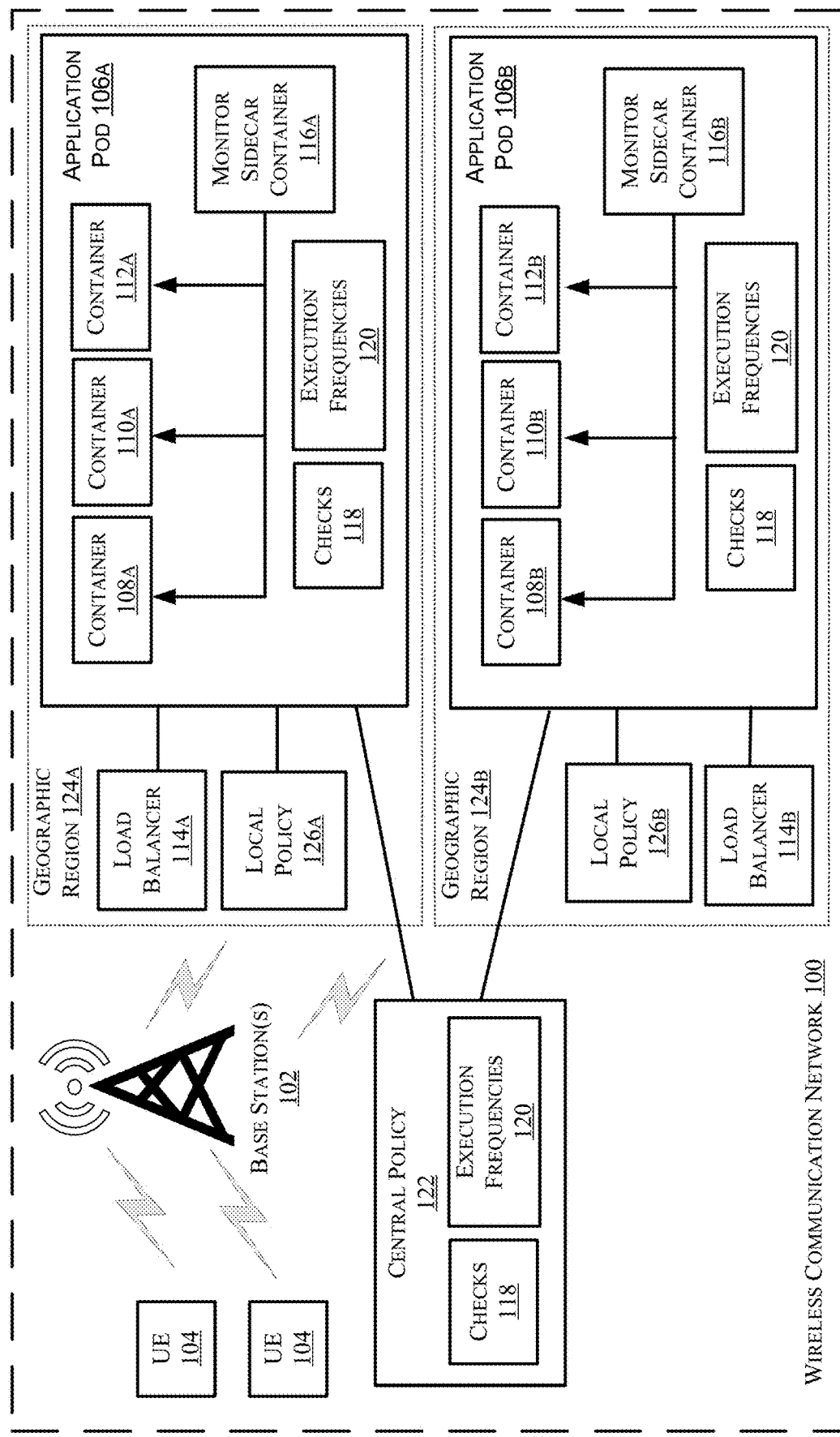
FIGS. 1A and 1B schematically illustrate a portion of a wireless communication network that includes application pods for executing containers and monitor sidecar containers, in accordance with various configurations.

Techniques and architecture are described herein for a monitor container configured as a sidecar container. The monitor sidecar container may be inserted into a pod that includes one or more containers executing an instance of a service. The monitor sidecar container may monitor the containers within a pod for various categories of checks. The categories of checks may include, for example, security, e.g., proper certificates installed, ports are not open, etc.; compliance, e.g., correct image installed, group policy installed, etc.; health, e.g., responsiveness, resources, e.g., CPU, memory, etc., not exhausted, etc.; and functionality, e.g., a ping test, comprehensive request/response testing, etc. The list of categories of checks is simply an example and is not meant to be limiting. In configurations, new categories of checks may be added in the future. The execution frequency for checks may be different for each category. The example of categories and list of checks within each category is configurable and may be maintained in a central repository, e.g., a central policy. The checks on the containers may be executed without the need to expose endpoints to the public.

In configurations, the central policy may be a centralized database containing policies for checks to be executed by the monitor sidecar container at execution frequencies or intervals for the monitor sidecar container to execute the checks. For example, the execution frequencies may be in a range of hourly, daily, every other day, every third day, weekly, bi-weekly, monthly, etc.

The monitor container may be deployed in a pod as a sidecar container, as previously noted. The monitor sidecar container may be auto-injected to an application pod by default. However, in configurations, persons associated with the application pod, e.g., managers, engineers, technicians, etc., may decide not to include a monitor sidecar container and thus may elect to opt out of auto-deployment. Since the monitor sidecar container operates as a sidecar container in an application pod, the monitor sidecar container may be deployed to application pods without affecting existing containers.

The monitor sidecar container may execute checks on all containers at specified frequencies within the application pod in which the monitor sidecar container is deployed. The list of checks to be executed and the execution frequency information is read by the monitor sidecar container from the central policy.

In configurations, there may be application pods executing instances of applications, e.g., services, in different geographical regions. For example, a first application pod may include three containers providing three services. The first application pod may be located in a first geographical region, e.g., executed by a system, e.g., one or more servers, located in a first geographic region. A second application pod may include instances of the same three containers executing instances of the same applications, e.g., providing the same services, where the second application pod is located in a second geographical region. Each of the two application pods may include a monitor sidecar container that executes monitoring activities of the application pods. Both monitor sidecar containers may obtain a list of checks to execute and execution frequency information, e.g., intervals, from the central policy. However, in configurations, each geographical region may have its own local policy due to differences within the geographical region related to regulations, rules, laws, etc. In configurations, a local policy within a specific geographical region may be in addition to a global central policy that communicates with all application pods regardless of the geographical region for the application pods. The local policies may extend all settings from the global central policy but may override," e.g., overwrite, one or more of the settings, e.g., categories, checks, etc., of the global central policy. In configurations, the global central policy may include all lists of checks, execution frequencies or intervals, and other information, including lists of checks, execution frequencies or intervals, and other information based on local regulations, local rules, local laws, etc. and thus, there are no local policies.

In configurations, since the checks to be executed need to be executed at varying frequencies or intervals, the monitor sidecar container needs to always be active. Additionally, since the monitor sidecar container executes as a sidecar container in an application pod, the monitor sidecar container has access to shared resources within the application pod.

In configurations, the central policy may be periodically updated to include additional checks for the monitor sidecar containers to execute with respect to containers within their application pods. The additional checks may be in addition to current checks or may replace some or all of the current checks. The monitor sidecar containers may obtain the changes from the central policy and execute the new checks or additional checks for all containers executing within their application pods.

As previously noted, the checks may relate to, for example, security, compliance, health, and functionality. In configurations, the functionality set of checks may include checking if a service API endpoint is functioning by performing a ping test. Additionally, the functionality set of checks may include checking if all dependent service endpoints, e.g., endpoints within a chain of services that are executed as a chain of services, are operating by performing a ping test. The dependent endpoints may be determined by reading policies of containers which contain a list of dependencies. In configurations, the functionality tests may also be extended by executing more complex synthetic transactions and parsing returned response for expected results.

In configurations, one or more containers may correspond to (e.g., provide the same service) as one or more other containers in an application pod and/or other application pods. Thus, in configurations, one or more load balancers may be provided to route traffic among the containers and/or the application pods.

If upon executing checks a container fails, the container may be taken out of service, e.g. taken out of rotation so that the failed container does not serve traffic. In configurations, there may be a state where there are no active running containers for a particular service to serve traffic because all instances of the containers providing the particular service have failed and thus all of the containers are out of rotation. In such a situation, alarms/alerts may be provided to engage network engineers to take action.

In configurations, a container may fail if one or more checks fail. In configurations, checks may have a failure threshold and only when the threshold is exceeded will a container be marked as failed and taken out of service. In configurations, there is an option to skip some failures (for example by making changes to a local policy) and not take the container out of service if the failures are deemed non-critical. In such circumstances, the failures might be logged as a warning. The container may be fixed and placed back into service, or the needed service may be provided by another container within another application pod.

In configurations, a monitor sidecar container may store data relating to execution of the various checks in a separate database. The data may be used to create a dashboard that a user may view. The dashboard may indicate which containers are active and which containers are out of service due to failure of the checks. Additionally, the monitor sidecar containers may provide an alert when a container is non-compliant and provide the alerts on various platforms to users, e.g., email, text messages, phone calls, and various other communication channels, e.g., a slack channel.

In configurations, the monitor sidecar container may be part of a run service that is responsible for executing tests on containers in the application pod. A monitor policy service may fetch data from the global central policy and local policies. A monitor storage service may store data in, for example, persistent storage.

Figure 1B:
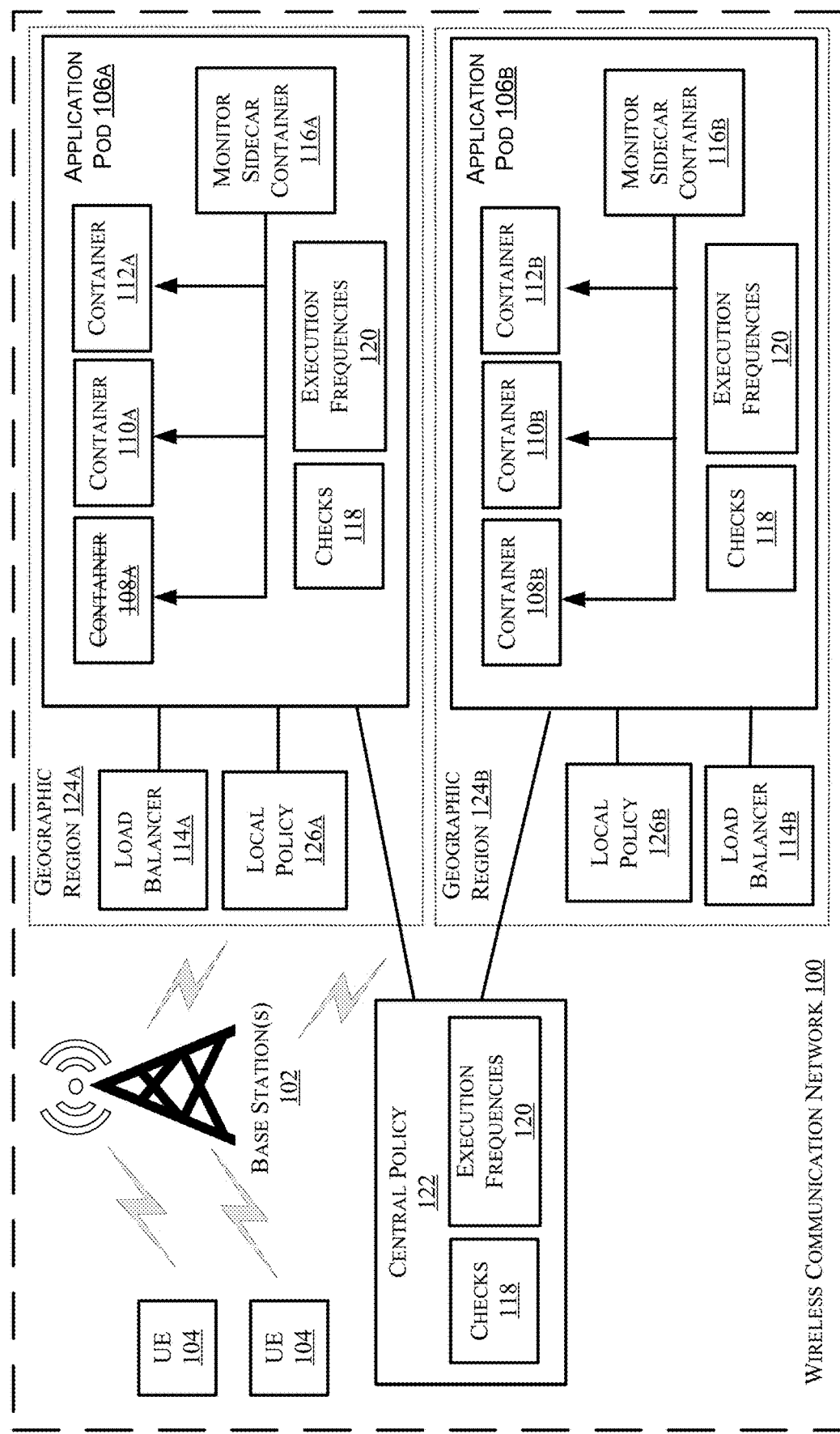

FIGS. 1A and 1B schematically illustrate a portion of a wireless communication network 100. The wireless communication network 100 includes one or more base stations 102 that are configured to operate according to one or more operating protocols. User equipments (UEs) 104 are configured to operate within the wireless communication network 100 according to one or more operating protocols. In configurations, the one or more of the base stations 102 and one or more of the UEs 104 are configured to operate according to at least 5G operating protocols. One or more base stations 102 and one or more of the UEs 104 may be additionally, or alternatively, configured to operate according to other operating protocols including, but not limited to, Global System for Mobile Communications (GSM), Time Division Multiple Access (TDMA), Universal Mobile Telecommunications System (UMTS), Evolution-Data Optimized (EVDO), 3G, 4G, Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology, and/or the like. FIG. 1 also illustrates Internet of things (IoT) devices 106 (also known as a machine-to-machine (M2M) device) configured to operate within the wireless communication network 100. Generally, there are many wireless communication devices, e.g., UEs 104, and IoT devices 106, operating within the wireless communication network 100.

The UEs 104 may be implemented as a mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, a motor vehicle, and/or similar mobile devices. In configurations, one or more UEs 104 may be implemented as Internet of things (IoT) devices (also known as a machine-to-machine (M2M) device) configured to operate within the wireless communication network 100. Although this description predominantly describes the UEs 104 as being "mobile" (i.e., configured to be carried and moved around), it is to be appreciated that the UEs 104 may represent various types of communication devices that are generally stationary as well, such as televisions, appliances, desktop computers, game consoles, set top boxes, and the like. In this sense, the terms "communication device," "wireless device," "wireless communication device," "wireline device," "mobile device," "mobile communication device," "computing device," "mobile computing device," and "user equipment (UE)" may be used interchangeably herein to describe any communication device capable of performing the techniques described herein. Furthermore, the UEs 104 may be capable of communicating over wired networks, and/or wirelessly using any suitable wireless communications/data technology, protocol, or standard, such as those mentioned above.

In configurations, the wireless communication network 100 includes one or more application pods 106. The example of FIGS. 1A and 1B includes two application pods 106a, 106b. However, in configurations the wireless communication network 100 includes thousands or even millions of application pods executing in a cloud implemented computing environment. Application pod 106a includes three containers 108a, 110a, and 112a, while application pod 106b includes three corresponding containers 108b, 110b, and 112b. Each container executes an application that provides a service. While in the example of FIGS. 1A and 1B only three containers are illustrated, more or fewer containers may be included in one or both of the application pods 106a, 106b. Additionally, while the containers 108a, 110a, and 112a correspond to (e.g., provide the same service), the containers 108b, 110b, and 112b, it is to be understood that application pods may include, and often do include, different containers. For the example of FIGS. 1A and 1B, containers 108a, 108b, 110a, 110b provide service A, while containers 112a, 112b provide service B. Thus, in configurations, load balancers 114a, 114b may be provided to route traffic among the containers and/or the application pods 106a, 106b.

As can be seen in the example of FIGS. 1A and 1B, each application pod includes a monitor container 116a, 116b, respectively. The monitor containers 116a, 116b are each configured as a sidecar container and thus, may be referred to herein as monitor sidecar containers 116a, 116b. The monitor sidecar containers 116a, 116b may be inserted into the application pods 106a, 106b that includes the containers 108a, 108b, 110a, 110b, 112a, 112b executing an instance of a service, e.g., service A or service B.

The monitor sidecar containers 116a, 116b may monitor the containers 108a, 108b, 110a, 110b, 112a, 112b within their respective application pods 106a, 106b for various categories of checks 118. The categories may include, for example, security, where checks 118 may include, e.g., proper certificates installed, ports are not open, etc.; compliance, where checks 118 may include, e.g., correct image installed, group policy installed, etc.; health, where checks 118 may include, e.g., responsiveness, resources, e.g., CPU, memory, etc., not exhausted, etc.; and functionality, where checks 118 may include, e.g., a ping test, comprehensive request/response testing, etc. The list of categories of checks 118, as well as the actual checks 118 themselves, is simply an example and is not meant to be limiting. In configurations, new categories of checks 118 may be added in the future. An execution frequency 120 for the checks 118 may be different for each category of checks 118. For example, the execution frequencies for various categories of checks 118 may be in a range of hourly, daily, every other day, every third day, weekly, bi-weekly, monthly, etc. In configurations, an execution frequency 120 for each of the various checks 118 within a category may be different.

In configurations, the example of categories and list of checks 118 within each category is configurable and may be maintained in a central repository, e.g., a central policy 122. Additionally, in configurations, the checks 118 on the containers 108a, 108b, 110a, 110b, 112a, 112b may be executed without the need to expose endpoints to the public.

In configurations, the central policy 122 may be a centralized database containing policies for checks 118 to be executed by the monitor sidecar containers 116a, 116b at execution frequencies 120 for the monitor sidecar containers 116a, 116b to execute the checks 118. The monitor sidecar containers 106a, 106b may be auto-injected to the corresponding application pods 106a, 106b by default. However, in configurations, persons associated with an application pod 106, e.g., managers, engineers, technicians, etc., may decide not to include a monitor sidecar container 116 and thus may elect to opt out of auto-deployment. Since the monitor sidecar containers 116 operate as sidecar containers in a corresponding application pod 106, the monitor sidecar containers 116 may be deployed to corresponding application pods 106 without affecting existing containers within the application pods 106.

The monitor sidecar containers 116a, 116b may execute checks 118 on all containers in a corresponding application pod 106 at specified execution frequencies 120, e.g., intervals, within the corresponding application pod 106 in which the monitor sidecar container 116 is deployed. The list of checks 118 to be executed and the execution frequency 120 information is read by the monitor sidecar containers 116 from the central policy 122.

In configurations, there may be application pods 106 executing instances of applications, e.g., services, in containers in different geographical regions. For example, the first application pod 106a may include three containers 108a, 110a, 112a providing two services, e.g., service A and service B, as previously noted. The first application pod 106a may be located in a first geographical region 124a, e.g., executed by a system, e.g., one or more servers, located in the first geographic region 124a. The second application pod 106b may include three containers 108b, 110b, 112b executing instances of the same applications, e.g., providing the same services, e.g. service A and service B, as previously noted. However, the second application pod 106b may be located in a second geographical region 124b.

As previously noted, each of the two application pods 106a, 106b may include a monitor sidecar container 116a, 116b, respectively, that executes monitoring activities of the containers executing in the application pods 106a, 106b. Both monitor sidecar containers 116a, 116b may obtain a list of checks 118 to execute and execution frequency 120 information, e.g., intervals, from the central policy 122. However, in configurations, each geographical region 124 may have its own local policy 126a, 126b, respectively, due to differences within the geographical regions 124a, 124b related to regulations, rules, laws, etc. In configurations, a local policy 126 within a specific geographical region 124 may be in addition to the global central policy 122 that communicates with all application pods 106 and monitor sidecar containers 116 regardless of the geographical region 124 for the application pods 106 and monitor sidecar containers 116. The local policies 126 may extend all settings from the global central policy 122 but may override," e.g., overwrite, one or more of the settings, e.g., categories, checks, etc., of the global central policy 122. In configurations, the global central policy 122 may include all lists of checks 118, execution frequencies 120, and other information, including lists of checks 118, execution frequencies 120, and other information based on local regulations, local rules, local laws, etc. and thus, there may be no local policies 126.

In configurations, since the checks 118 to be executed need to be executed at varying frequencies or intervals, e.g., execution frequencies 120, the monitor sidecar containers 116 needs to always be active. Additionally, since the monitor sidecar containers 116 execute as sidecar containers in the application pods, the monitor sidecar containers 116 have access to shared resources within their corresponding application pods 106.

In configurations, the central policy 122 may be periodically updated to include additional checks 118 for the monitor sidecar containers 116a, 116b to execute with respect to containers within their corresponding application pods 106a, 106b. The additional checks 118 may be in addition to existing checks 118 or may replace some or all of the existing checks 118. The monitor sidecar containers 116a, 116b may obtain the changes from the central policy 122 and execute the new checks 118 for all containers executing within their corresponding application pods 106a, 106b.

As previously noted, the checks 118 may relate to, for example, security, compliance, health, and functionality. In configurations, the functionality set of checks may include checking if a service API endpoint is functioning by performing a ping test. Additionally, the functionality set of checks 118 may include checking if all dependent service endpoints, e.g., endpoints within a chain of services that are executed as a chain of services, are operating by performing a ping test. The dependent endpoints may be determined by reading policies of containers which contain a list of dependencies. In configurations, the functionality tests may also be extended by executing more complex synthetic transactions and parsing returned response for expected results.

Referring to FIG. 1B, if upon executing checks 118 a container fails, the container may be taken out of service. For example, if container 108a fails, the container 108a may be taken out of service. The container 108a may fail if one or more checks 118 fail. In configurations, checks 118 may have a failure threshold and only when the threshold is exceeded will the container 108a be marked as failed and taken out of service. In configurations, there is an option to skip some failures (for example by making changes to a local policy 126) and not take the container 108a out of service if the failures are deemed non-critical. In such circumstances, the failures might be logged as a warning. Traffic may be routed to container 108b until container 108a is fixed (or replaced with a new container) and placed back into service. Additionally, since, for example, container 108a provides service A and container 110a also provides service A, traffic needing service A may be provided by container 110a within application pod 106a.

In configurations, monitor sidecar containers 116 may store data relating to execution of the various checks in a database (not illustrated). The data may be used to create a dashboard (not illustrated) that a user may view. The dashboard may indicate which containers are active and which containers are out of service due to failure of the checks 118. Additionally, the monitor sidecar containers 116 may provide an alert when a container is noncompliant and provide the alerts on various platforms to users, e.g., email, text messages, phone calls, and various other communication channels, e.g., a slack channel. In configurations, the monitor sidecar containers 116a, 116b may be part of a run service that is responsible for executing tests on containers in the application pods 106a, 106b. A monitor policy service may fetch data from the global central policy 122 and local policies 126. A monitor storage service may store data in, for example, persistent storage.

Figure 2:
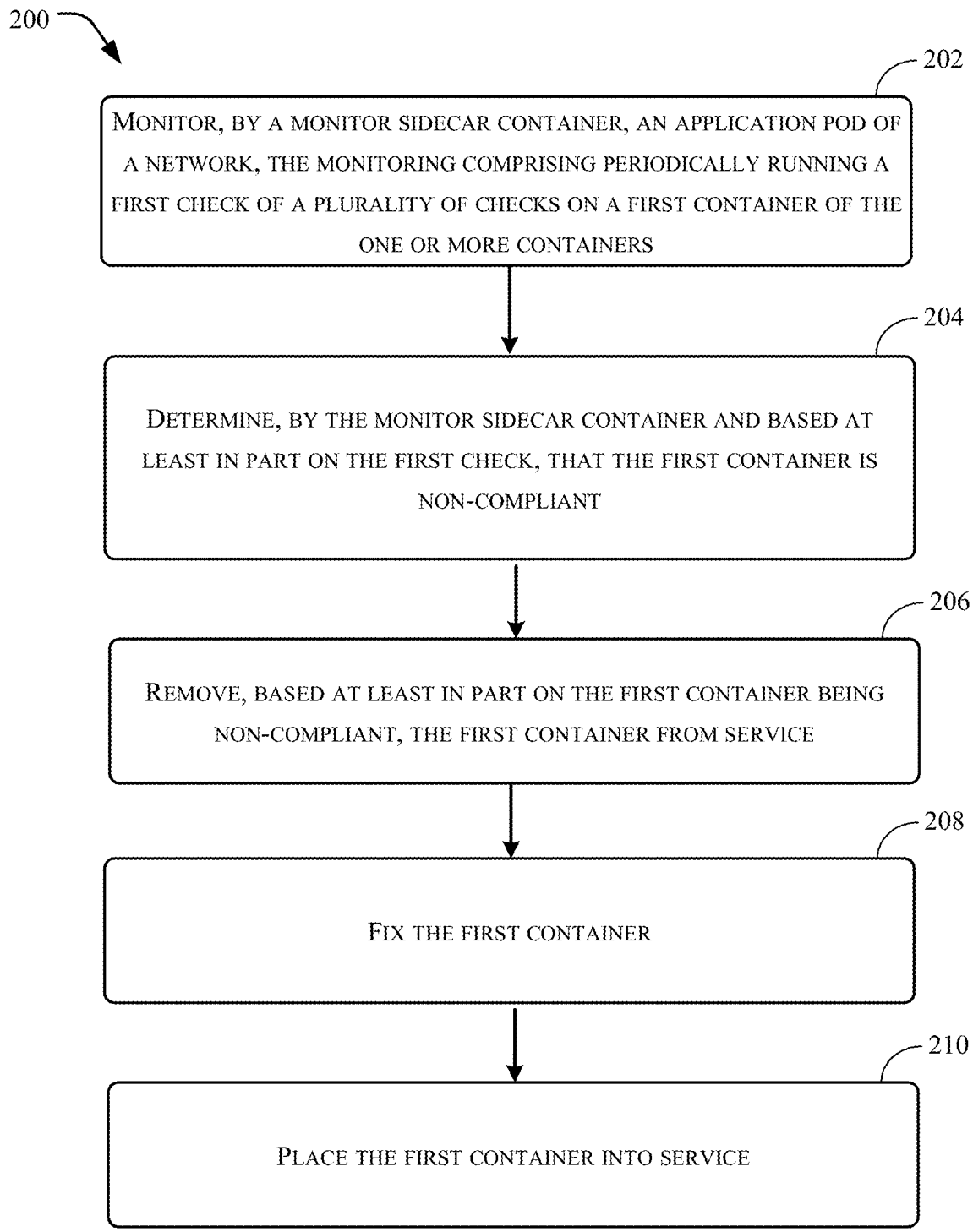
FIG. 2 is a flow diagram of an example process for monitoring, by a monitor sidecar container, an application pod in the wireless communication network of FIGS. 1A and 1B, in accordance with various configurations.

FIG. 2 is a flow diagram of an illustrative process that may be implemented within or in association with the wireless communication network 100. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices FIG. 2 is a flow diagram of an example process 200 for monitoring an application pod, e.g., one of application pods 106a, 106b, in a network, e.g., wireless communication network 100, using a monitor sidecar container, e.g. one of monitor sidecar containers 116a, 116b. At block 202, a monitor sidecar container monitors an application pod of a network. For example, monitor sidecar 116a monitors containers 108a, 110a, 112a within application pod 106a. Each of the containers 108a, 110a, 112a host a service for traffic of the wireless communication network 100. The monitoring comprises periodically executing a first check 118 of a plurality of checks 118 on a first container, e.g., container 108a, of the containers 108a, 110a, 112a. At block 204, the monitor sidecar container, based at least in part on the first check, determines that the first container is non-compliant. At block 206, based at least in part on the first container being non-compliant, the first container is removed from service. At block 208, the first container is fixed. At block 210, the first container is placed in service. In configurations, instead of fixing the first container, the first container may be replaced with a new container.

While the techniques and architecture described herein have been primarily described with respect to a wireless communication network, those skilled in the art will recognize that the techniques and architecture are equally applicable to other types of networks that utilize application pods and containers to provide services to various devices.

Figure 3:
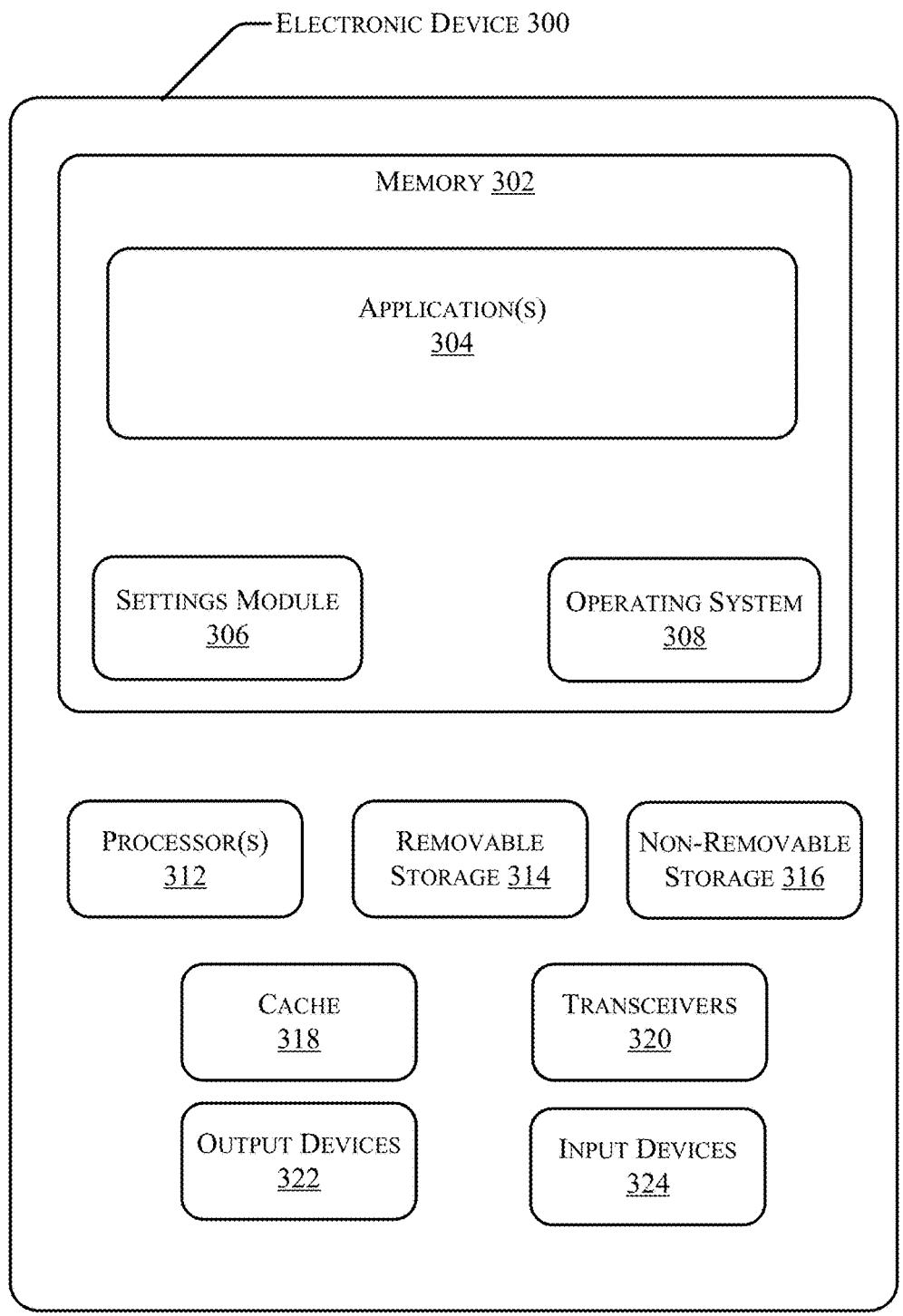
FIG. 3 schematically illustrates a component level view of an example electronic device configured for use in the wireless communication network of FIGS. 1A and 1B, in accordance with various configurations.

FIG. 3 schematically illustrates a component level view of an example electronic device 300, such as UE 104, configured to function within wireless communication network 100. The electronic device 300 may include more or less components depending on the type of electronic device. As illustrated, the electronic device 300 comprises a system memory 302, e.g., computer-readable media, storing application(s) 304. For example, the system memory 302 may include an application (app) configured to implement one or more functions with respect to RF signal level monitoring as described herein. The mobile device also comprises a settings module 306, and an operating system 308. Also, the electronic device 300 includes processor(s) 312, a removable storage 314, a non-removable storage 316, cache 318, transceivers 320, output device(s) 322, and input device(s) 324. In various implementations, system memory 302 is volatile (such as RAM), non-volatile (such as ROM, flash memory, etc.) or some combination of the two. In some implementations, the processor(s) 312 is a central processing unit (CPU), a graphics processing unit (GPU), or both CPU and GPU, or any other sort of processing unit.

The electronic device 300 may also include additional data storage devices (removable and/or non-removable) such as, for example, magnetic disks, optical disks, or tape. Such additional data storage may include removable storage 314 and non-removable storage 316. Additionally, the electronic device 300 includes cache 318.

Non-transitory computer-readable media may include volatile and nonvolatile, removable and non-removable tangible, physical media implemented in technology for storage of information, such as computer readable instructions, data structures, program modules, or other data. System memory 302, removable storage 314, non-removable storage 316 and cache 318 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the electronic device 300. Any such non-transitory computer-readable media may be part of the electronic device 300. The processor(s) 312 may be configured to execute instructions, which may be stored in the non-transitory computer-readable media or in other computer-readable media accessible to the processor(s) 312.

In some implementations, the transceivers 320 include any sort of transceivers known in the art. For example, the transceivers 320 may include a radio transceiver that performs the function of transmitting and receiving radio frequency communications via an antenna (not shown). Also, or alternatively, the transceivers 320 may include wireless modem(s) to facilitate wireless connectivity with other computing devices. Further, the transceivers 320 may include wired communication components, such as an Ethernet port, for communicating with other networked devices.

In some implementations, the output devices 322 include any sort of output devices known in the art, such as a display (e.g., a liquid crystal display), speakers, a vibrating mechanism, or a tactile feedback mechanism. Output devices 322 also include ports for one or more peripheral devices, such as headphones, peripheral speakers, or a peripheral display.

In various implementations, input devices 324 include any sort of input devices known in the art. For example, input devices 324 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 324 may be used to enter preferences of a user of the electronic device 300 to define how the user wishes certain calls from third parties to be handled by the wireless communication network, as previously described herein.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 302 is an example of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may various perform operations. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
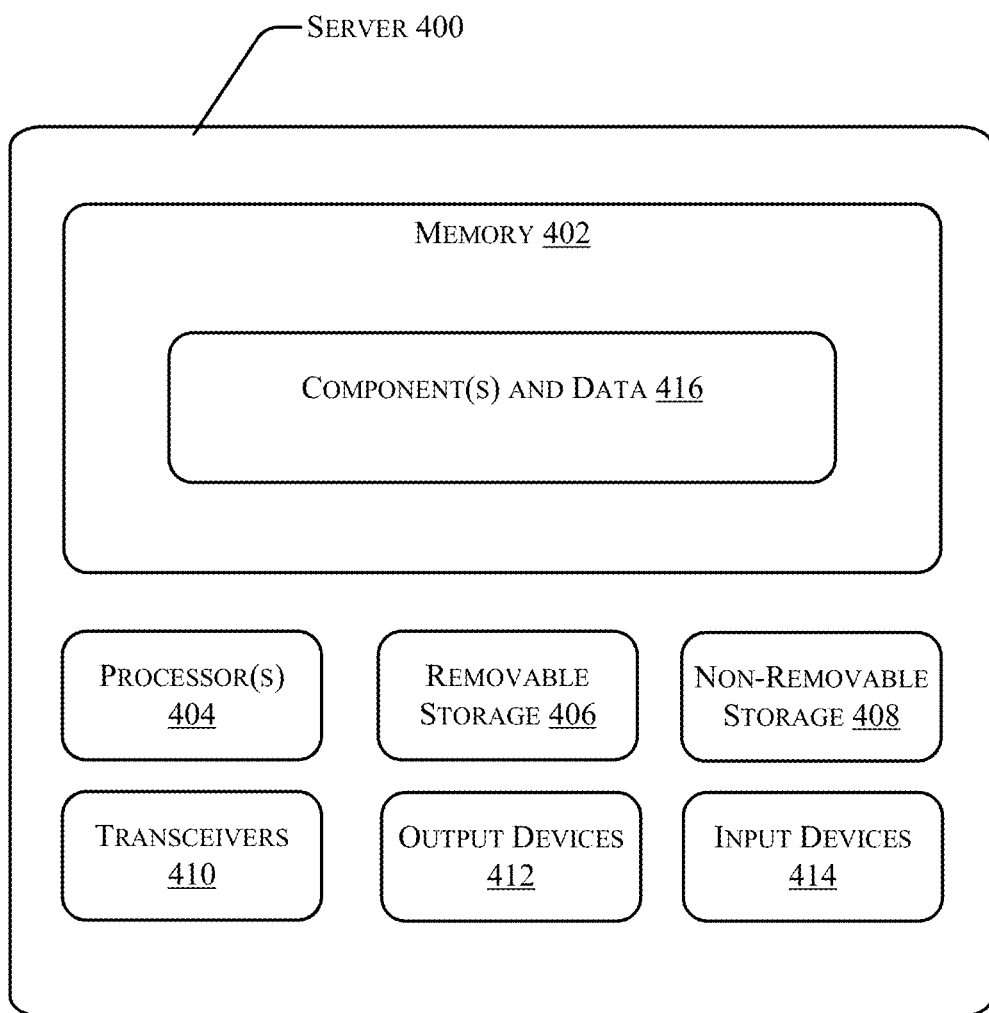
FIG. 4 schematically illustrates a component level view of a server configured for use in the wireless communication network of FIG. 1, in accordance with various configurations.

FIG. 4 illustrates a component level view of a server 400 configured for use within a wireless communication network, e.g., wireless communication network 100, in order to provide various services within the wireless communication network, according to the techniques described herein. For example, one or more servers 400 may be configured to implement application pods 106a, 106b, containers 108a, 1088b, 110a, 110b, 112a, 112b, and monitor sidecar containers 116a, 116b. Additionally, one or more servers 400 may be configured to implement the central policy 122, as well as any local central policies 126. Also, one or more servers 400 may be configured to operate as the base station 102.

As illustrated, the server 400 comprises a system memory 402 that may store one or more components, modules, and/or applications and data 416 for interacting with electronic devices 300, e.g., UEs 104, or other electronic devices that may be configured as connected devices, as described herein. Also, the server 400 may include processor(s) 404, a removable storage 406, a non-removable storage 408, transceivers 410, output device(s) 412, and input device(s) 414.

In various implementations, system memory 402 is volatile (such as RAM), non-volatile (such as ROM, flash memory, etc.), or some combination of the two. In some implementations, the processor(s) 404 is a Central Processing Unit (CPU), a Graphics Processing Unit (GPU), or both CPU and GPU, or any other sort of processing unit.

The server 400 may also include additional data storage devices (removable and/or non-removable) such as, for example, magnetic disks, optical disks, or tape. Such additional storage is illustrated in FIG. 4 by removable storage 406 and non-removable storage 408. The one or more of the memory 402, the removable storage 406 and/or the non-removable 408 may include module(s) and data 416 (illustrated in the memory 402). The module(s) and data 416 may include instructions executable by, for example, the processor(s) 404.

Non-transitory computer-readable media may include volatile and nonvolatile, removable and non-removable tangible, physical media implemented in technology for storage of information, such as computer readable instructions, data structures, program modules, or other data. System memory 402, removable storage 406 and non-removable storage 408 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 400. Any such non-transitory computer-readable media may be part of the server 400.

In some implementations, the transceivers 410 include any sort of transceivers known in the art. For example, the transceivers 410 may include wired communication components, such as an Ethernet port, for communicating with other networked devices. Also, or instead of, the transceivers 410 may include wireless modem(s) to facilitate wireless connectivity with other computing devices. Further, the transceivers 410 may include a radio transceiver that performs the function of transmitting and receiving radio frequency communications via an antenna.

In some implementations, the output devices 412 include any sort of output devices known in the art, such as a display (e.g., a liquid crystal display), speakers, a vibrating mechanism, or a tactile feedback mechanism. Output devices 412 also include ports for one or more peripheral devices, such as headphones, peripheral speakers, or a peripheral display.

In various implementations, input devices 414 include any sort of input devices known in the art. For example, input devices 414 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 302 and memory 402 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media.

Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1A, 1B, and 2. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
monitoring, by a monitor sidecar container, a first application pod in a first geographic region of a network, the first application pod comprising multiple containers and multiple monitor sidecar containers,
each of the multiple containers hosting a service for traffic of the network, the monitor sider container being a first monitor sidecar container of the multiple monitor sidecar containers, the first monitor sidecar container configured to monitor a first container of the multiple containers,
other monitor sidecar containers of the multiple monitor sidecar containers configured to individually monitor corresponding containers of the multiple containers, and
the monitoring comprising periodically executing a first check of a plurality of checks on the first container of the multiple containers;

determining, by the monitor sidecar container and based at least in part on the first check, that the first container is non-compliant;
removing, based at least in part on the first container being non-compliant, the first container from service;
replacing the first container, until the first container is fixed, by routing traffic to a different container of one or more containers in a second application pod in a second geographic region different from the first geographic region, the different container providing a same service as the first container;
fixing the first container; and
placing the first container into service.

2. The method of claim 1, wherein periodically executing the first check of the plurality of checks on the first container comprises periodically executing the first check on the first container at an execution frequency in a range of hourly, daily, every other day, every third day, weekly, bi-weekly, or monthly.

3. The method of claim 2, wherein the first check is executed at a first execution frequency and a second check of the plurality of checks is execution at a second execution frequency different from the first execution frequency.

4. The method of claim 3, further comprising:
storing the checks and corresponding execution frequencies in a central repository; and
retrieving, by the monitor sidecar container, the checks and corresponding execution frequencies from the central repository.

5. The method of claim 4, further comprising:
storing one or more new checks and one or more corresponding new execution frequencies in the central repository; and
retrieving, by the monitor sidecar container, the one or more new checks and the one or more corresponding new execution frequencies from the central repository.

6. The method of claim 1, wherein the monitor sidecar container is configured to monitor all of the multiple containers in the first application pod.

7. A non-transitory storage medium comprising instructions stored thereon, the instructions being executable by one or more processors to perform actions comprising:
implementing a monitor sidecar container within a first application pod in a first geographic region of a network;
monitoring, by the monitor sidecar container, the first application pod, the first application pod comprising multiple containers and multiple monitor sidecar containers,
each of the multiple containers hosting a service for traffic of the network,
the monitor sider container being a first monitor sidecar container of the multiple monitor sidecar containers, the first monitor sidecar container configured to monitor a first container of the multiple containers,
other monitor sidecar containers of the multiple monitor sidecar containers configured to individually monitor corresponding containers of the multiple containers, and
the monitoring comprising periodically executing a first check of a plurality of checks on the first container of the multiple containers;
determining, by the monitor sidecar container and based at least in part on the first check, that the first container is non-compliant;
removing, based at least in part on the first container being non-compliant, the first container from service;
replacing the first container, until the first container is fixed, by routing traffic to a different container of one or more containers in a second application pod in a second geographic region different from the first geographic region, the different container providing a same service as the first container;
fixing the first container; and
placing the first container into service.

8. The non-transitory storage medium of claim 7, wherein periodically executing the first check of the plurality of checks on the first container comprises periodically executing the first check on the first container at an execution frequency in a range of hourly, daily, every other day, every third day, weekly, bi-weekly, or monthly.

9. The non-transitory storage medium of claim 8, wherein the first check is execution at a first execution frequency and a second check of the plurality of checks is executed at a second execution frequency different from the first execution frequency.

10. The non-transitory storage medium of claim 9, wherein the actions further comprise:
storing the checks and corresponding execution frequencies in a central repository; and
retrieving, by the monitor sidecar container, the checks and corresponding execution frequencies from the central repository.

11. The non-transitory storage medium of claim 10, wherein the actions further comprise:
storing one or more new checks and one or more corresponding new execution frequencies in the central repository; and
retrieving, by the monitor sidecar container, the one or more new checks and the one or more corresponding new execution frequencies from the central repository.

12. The non-transitory storage medium of claim 7, wherein the monitor sidecar container is configured to monitor all of the multiple containers in the first application pod.

13. An apparatus comprising:
one or more processors; and
a non-transitory storage medium comprising instructions stored thereon, the instructions being executable by the one or more processors to cause the processors to perform one or more actions comprising:
implementing a monitor sidecar container within a first application pod in a first geographic region of a network;
monitoring, by the monitor sidecar container, the first application pod, the first application pod comprising multiple containers and multiple monitor sidecar containers,
each of the multiple containers hosting a service for traffic of the network,
the monitor sidecar container being a first monitor sidecar container of the multiple monitor sidecar containers, the first monitor sider container configured to monitor a first container of the multiple containers,
other monitor sidecar containers of the multiple monitor sidecar containers configured to individually monitor corresponding containers of the multiple containers, and
the monitoring comprising periodically executing a first check of a plurality of checks on the first container of the multiple containers;

determining, by the monitor sidecar container and based at least in part on the first check, that the first container is non-compliant;

removing, based at least in part on the first container being non-compliant, the first container from service;

replacing the first container, until the first container is fixed, by routing traffic to a different container of one or more containers in a second application pod in a second geographic region different from the first geographic region, the different container providing a same service as the first container;

fixing the first container; and placing the first container into service.

14. The apparatus of claim 13, wherein periodically executing the first check of the plurality of checks on the first container comprises periodically executing the first check on the first container at an execution frequency in a range of hourly, daily, every other day, every third day, weekly, bi-weekly, or monthly.

15. The apparatus of claim 14, wherein the first check is executed at a first execution frequency and a second check of the plurality of checks is executed at a second execution frequency different from the first execution frequency.

16. The apparatus of claim 15, wherein the actions further comprise:

storing the checks and corresponding execution frequencies in a central repository; and retrieving, by the monitor sidecar container, the checks and corresponding execution frequencies from the central repository.

17. The apparatus of claim 16, wherein the actions further comprise:

storing one or more new checks and one or more corresponding new execution frequencies in the central repository; and retrieving, by the monitor sidecar container, the one or more new checks and the one or more corresponding new execution frequencies from the central repository.

18. The apparatus of claim 13, wherein the monitor sidecar container is configured to monitor all of the multiple containers in the first application pod.

* * * * *